UNITED STATES PATENT OFFICE.

CARL WÜLFFING, OF HÖNNINGEN, GERMANY.

OXID OF IRON.

No. 868,385.　　　　Specification of Letters Patent.　　　Patented Oct. 15, 1907.

Application filed June 18, 1906. Serial No. 322,299.

*To all whom it may concern:*

Be it known that I, CARL WÜLFFING, chemist, a subject of the German Emperor, residing at Hönningen, Germany, have invented a certain new and useful Oxid of Iron, of which the following is a specification.

It is known, that deep-black and permanent oxid of iron $Fe_3O_4$ may be obtained from ferrous chlorid liquors, resulting as a by-product in galvanizing works in the process of cleaning sheet iron by means of hydrochloric acid. The said liquors are first mixed with scrap-iron and evaporated to dryness, the residue is dissolved in water, partly saturated with ammonia and stirred or aerated (by blowing air into the same), then heated, some ammonia is again added and then the liquid filtered off from the oxid of iron which has separated out.

I have found, that a blue-black oxid of iron, which is also very permanent, and which contains less ferrous oxid, than that corresponding to the formula $Fe_3O_4$, may be obtained in the following manner:—

The acid liquor containing chlorid or sulfate of iron is treated with scrap-iron, in order to neutralize the free acid present, after which (without previous evaporation to dryness) ammonia is added to the liquor, the quantity of ammonia being about two-thirds of that necessary for complete saturation and the density of the resulting liquid being about 10.5° Baumé. Subsequently the liquid is stirred vigorously, or air is introduced into it, to cause oxidation, until the mass is yellow. The latter is then heated to the boiling point, the boiler or retort containing it is closed, an additional quantity of ammonia, sufficient for complete saturation, is pumped into the mass and the latter heated, thereby causing it to turn black in a short time. The pressure employed need not exceed half an atmosphere above ordinary atmospheric pressure. Finally air is again conducted into the product for a short time, in some cases with the addition of a small quantity of ammonia, and then the liquid filtered off.

The product is blue-black, magnetic, and of thoroughly fast color, which properties render it suitable for many industrial purposes.

The solution separated from the precipitated oxid of iron by filtration, is boiled down, to obtain ammonium chlorid or ammonium sulfate. From the latter the ammonia may be recovered by distillation with lime, and the ammonia thus obtained may be re-introduced into the process.

What I claim is:—

1. The process for obtaining permanent blue-black oxid of iron from ferrous liquors, which consists in neutralizing the acid liquors with scrap iron, then partly saturating them with ammonia, causing oxidation, then completely saturating with ammonia, heating under pressure in a closed receptacle, and finally conducting air into the product, subsfantially as described.

2. The herein described process for obtaining permanent blue-black oxid of iron from ferrous chlorid liquors, which consists in neutralizing the acid liquor with scrap-iron, then partly saturating it with ammonia, conducting air into the same for oxidation, then completely saturating with ammonia, heating under pressure in a closed receptacle, again conducting air into the liquid and separating the precipitate.

In testimony whereof I have set my hand hereunto in the presence of two subscribing witnesses.

CARL WÜLFFING.

Witnesses:
　HEINR. FUCHS,
　W. BUSCH.